(12) United States Patent
Takahashi

(10) Patent No.: US 9,294,678 B2
(45) Date of Patent: Mar. 22, 2016

(54) DISPLAY CONTROL APPARATUS AND CONTROL METHOD FOR DISPLAY CONTROL APPARATUS

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 14/460,185

(22) Filed: Aug. 14, 2014

(65) Prior Publication Data

US 2015/0055007 A1 Feb. 26, 2015

(30) Foreign Application Priority Data

Aug. 20, 2013 (JP) ................................. 2013-170693

(51) Int. Cl.
*H04N 5/232* (2006.01)
(52) U.S. Cl.
CPC ....... *H04N 5/23293* (2013.01); *H04N 5/23212* (2013.01)
(58) Field of Classification Search
CPC H04N 5/23293; H04N 5/2628; H04N 5/2356
See application file for complete search history.

(56) References Cited

U.S. PATENT DOCUMENTS

| 8,130,243 B2* | 3/2012 | Sudo ................... H04N 5/23219 345/632 |
| 2009/0009622 A1* | 1/2009 | Yoshida ................ H04N 5/232 348/222.1 |
| 2009/0009652 A1* | 1/2009 | Sudo ...................... H04N 5/772 348/349 |

FOREIGN PATENT DOCUMENTS

JP 2009-17123 A 1/2009

* cited by examiner

*Primary Examiner* — Tuan Ho
(74) *Attorney, Agent, or Firm* — Canon USA, Inc. I.P. Division

(57) ABSTRACT

A display control apparatus performs control so as to enlarge and display a portion of an image in response to a TELE operation performed while the entire image is being normally displayed, and performs control so as to change an enlargement area of the image to an area corresponding to an in-focus position within an area of the image in response to a press of a set button while the image is being enlarged and displayed. The set button has a function of displaying a FUNK menu when the set button is pressed while the entire image is being normally displayed.

18 Claims, 10 Drawing Sheets

| ORDER | IN-FOCUS POSITION |
|---|---|
| 1 |  |
| 2 |  |
| 3 |  |

DISPLAY CONTROL APPARATUS AND CONTROL METHOD FOR DISPLAY CONTROL APPARATUS

BACKGROUND OF THE INVENTION

1. Field of the Invention

The present invention relates to a display control apparatus displaying an enlarged image, a control method for the display control apparatus, and a storage medium.

2. Description of the Related Art

Conventionally, there has been known a camera that has a function of displaying an enlarged image of a target area in a focus checker (a screen used when an in-focus position is checked). This function allows a user to check an in-focus position of an image to be captured. Japanese Patent Application Laid-Open No. 2009-17123 discusses a method for displaying an enlarged target area. According to this method, when an information display switching button is pressed in reproduction mode, a screen transitions to a dedicated screen using the focus checker to display the enlarged target area.

In the method discussed in the Japanese Patent Application Laid-Open No. 2009-17123, however, a user needs to press the information display switching button several times before performing the enlargement operation, causing a laborious procedure for the user. Further, this method has another problem in which the information display switching button is not recognized by a user in spite of being arranged for focus check. Consequently, the user who does not recognize the information display switching button may not know that operation of such a button enables a screen to transition to a focus check screen. When such a user intends to check the focus and facial expression of a subject, the user is more likely to enlarge the image first. This enlargement operation complicates subsequent operations.

SUMMARY OF THE INVENTION

The present invention is directed to a display control apparatus and a control method therefor capable of shifting a display so that a user can check a specific subject by a more intuitive operation method.

According to an aspect of the present invention, a display control apparatus includes a display control unit configured, in response to an operation with respect to a first operation unit when an entire display by which an entire image is displayed on a display unit is being performed, to control a display so as to switch the entire display to an enlargement display by which a portion of the image is enlarged and displayed; and a control unit configured, in response to an operation performed with respect to a second operation unit different from the first operation unit when the enlargement display is being performed, to control a display area of the enlargement display so as to change the display area to an area corresponding to an in-focus position of the image.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
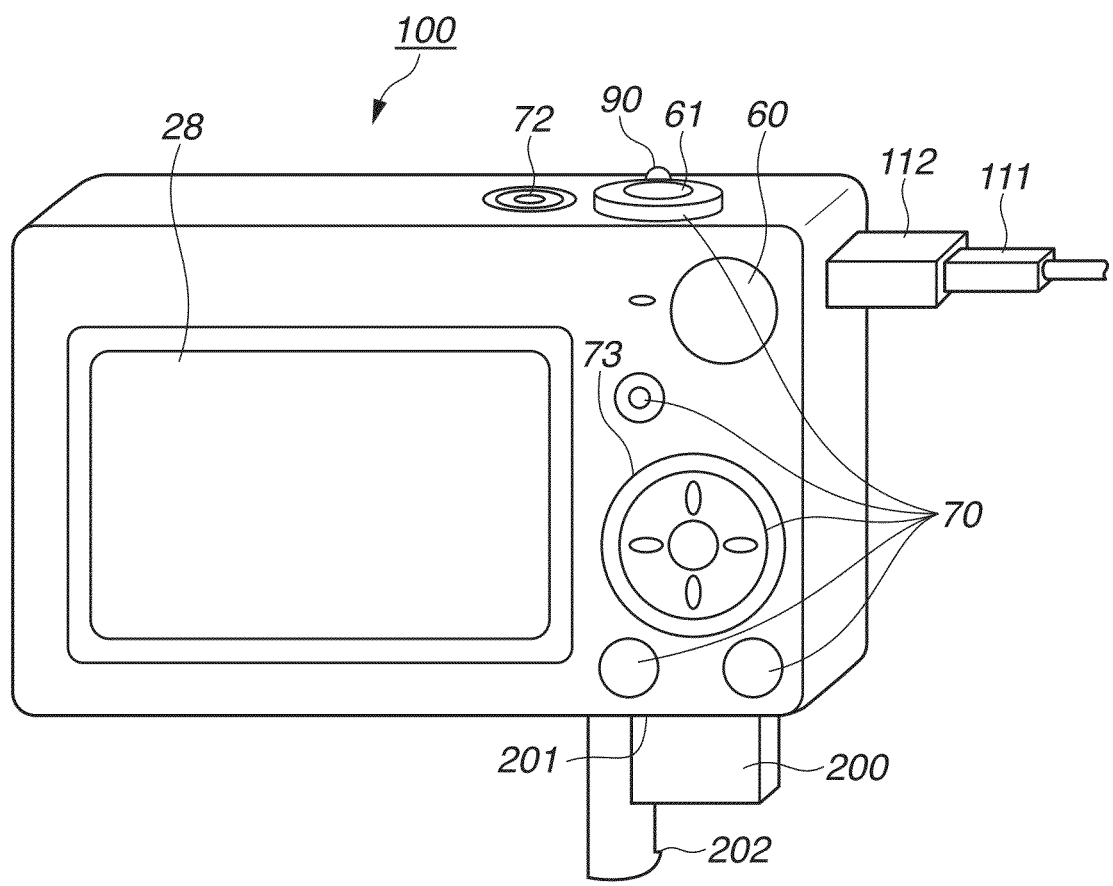
FIG. 1 is a diagram illustrating an example of an external configuration of a digital camera according to an exemplary embodiment of the present invention.

FIG. 1 is a diagram illustrating an example of an external configuration of a digital camera 100 serving as an example of an imaging apparatus according to a first exemplary embodiment.

In FIG. 1, the digital camera 100 includes a display unit 28 for displaying images and various information. The display unit 28 includes a touch panel, and can detect contact with respect to the display unit 28. A shutter button 61 is arranged to issue an image capturing instruction. A mode dial 60 is an operation member for switching one mode to another within various modes. A connector 112 connects a connection cable 111 and the digital camera 100.

An operation unit 70 includes operation members such as various switches, buttons, and a touch panel to receive various operations from a user. The operation unit 70 includes a controller wheel 73 serving as a rotatable operation member. The controller wheel 73 is used with a direction button when a selection item is instructed. A power switch 72 switches between power-on and power-off. A recording medium 200 is, for example, a memory card and a hard disk. A recording medium slot 201 is a slot in which the recording medium 200 is stored. The recording medium 200 stored in the recording medium slot 201 can communicate with the digital camera 100. A cover 202 covers the recording medium slot 201.

Figure 2:
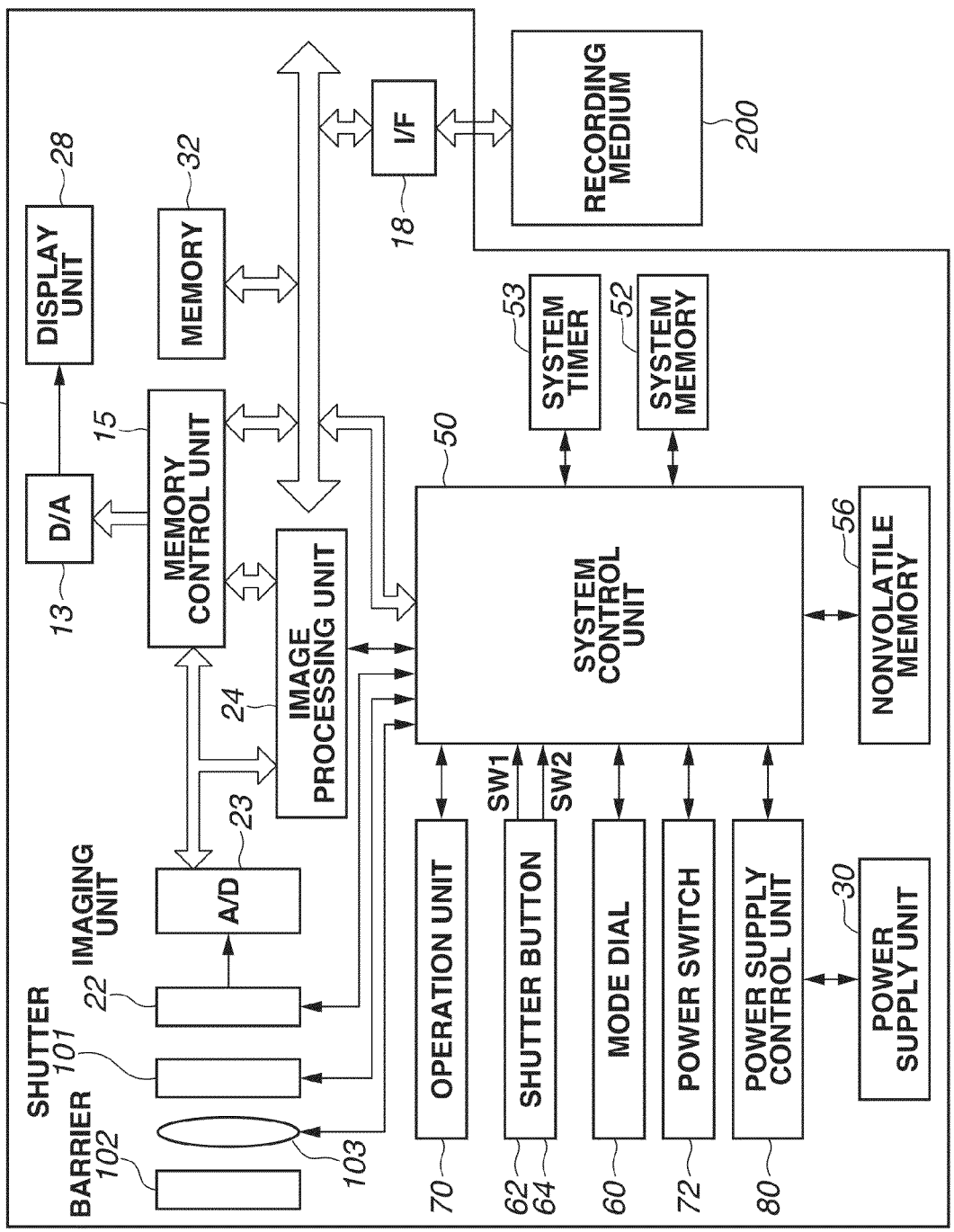
FIG. 2 is a block diagram illustrating an example of an internal configuration of the digital camera according to an exemplary embodiment of the present invention.

FIG. 2 is a block diagram illustrating an example of an internal configuration of the digital camera 100 according to the present exemplary embodiment.

In FIG. 2, an imaging lens 103 includes a focus lens, and a shutter 101 has a diaphragm function. An imaging unit 22 includes a sensor such as a charge coupled device (CCD) sensor and a complementary metal-oxide-semiconductor (CMOS) sensor which convert an optical image into electric signals. An analog-to-digital (A/D) converter 23 converts the analog signal output from the imaging unit 22 into a digital signal. A barrier 102 covers an imaging optical system including the imaging lens 103, thereby preventing the imaging optical system including the imaging lens 103, the shutter 101, and the imaging unit 22 of the digital camera 100 from being tainted and damaged.

An image processing unit 24 performs resize processing and color conversion processing on the data from the A/D converter 23 or the data from a memory control unit 15. The resize processing includes predetermined pixel interpolation into the data, and reduction of data size. Further, the image processing unit 24 performs predetermined arithmetic processing using image data acquired by capturing an image. A system control unit 50 performs light exposure control and focusing control based on the arithmetic result acquired by the image processing unit 24. Thus, automatic focus (AF) processing, automatic exposure (AE) processing, and flash preliminary emission (EF) processing of a through-the-lens (TTL) method are performed. In addition, the image processing unit 24 performs predetermined arithmetic processing using image data acquired by capturing an image, thereby performing automatic white balance (AWB) processing of the TTL method based on the acquired arithmetic result.

The data output from the A/D converter 23 is directly written into a memory 32 through the image processing unit 24 and the memory control unit 15 or the memory control unit 15. The memory 32 stores image data acquired from the imaging unit 22 through the A/D converter 23, and image data to be displayed on the display unit 28. Further, the memory 32 has a sufficient capacity for storing image data having the predetermined number of still images, and moving image data and audio data each having a predetermined time length. When captured images are sequentially displayed on the display unit 28, an electronic finder function (a through-the-lens image display) can be implemented.

The memory 32 also serves as a memory for image display (video memory). A digital-to-analog (D/A) converter 13 converts the image display data stored in the memory 32 into analog signals, and supplies the resultant signals to the display unit 28. Accordingly, the display image data written in the memory 32 is displayed as an image on the display unit 28 through the D/A converter 13. The display unit 28 includes a display device such as a liquid crystal display (LCD) on which an image is displayed according to the analog signals from the D/A converter 13.

A nonvolatile memory 56 is an electrically erasable and recordable memory. The nonvolatile memory 56 is, for example, an electrically erasable programmable read only memory (EEPROM). The nonvolatile memory 56 stores constants for operation of the system control unit 50, and programs. The programs stored in the nonvolatile memory 56 are used to execute each of various flowcharts described below in the present exemplary embodiment.

The system control unit 50 controls the entire digital camera 100. The system control unit 50 executes the program stored in the nonvolatile memory 56 to perform each processing described below according to the present exemplary embodiment. A system memory 52 is a random access memory (RAM), for example. In the system memory 52, the constants and variables for the operation of the system control unit 50, and the program read from the nonvolatile memory 56 are loaded. Further, the system control unit 50 controls the memory 32, the D/A converter 13, and the display unit 28 to perform a display control.

The mode dial 60, a first shutter switch 62, a second shutter switch 64, and the operation unit 70 serve as operation units for inputting various operation instructions to the system control unit 50. The mode dial 60 switches the operation mode of the system control unit 50 to an imaging mode in which still images and moving images are recordable, or a reproduction mode.

The first shutter switch 62 is turned on when the shutter button 61 of the digital camera 100 is operated halfway, i.e., half pressed (an image capturing preparation operation is instructed). When turned ON, the first shutter switch 62 generates a first shutter switch signal SW1. The first shutter switch signal SW1 initiates operations such as AF processing, AE processing, AWB processing, and EF processing (hereinafter, at least one of such processing is referred to as an image capturing preparation operation). Each of the processing is controlled by the system control unit 50.

The second shutter switch 64 is turned on when the shutter button 61 is operated completely, i.e., fully pressed (an image capturing instruction). When turned on, the second shutter switch 64 generates a second shutter switch signal SW2. With the second shutter switch signal SW2, the system control unit 50 starts a series of image capturing operations from the reading of signals from the imaging unit 22 to the writing of image data in the recording medium 200.

The operation members of the operation unit 70 serve as function buttons. An appropriate function is assigned to an operation member according to each situation based on the selection of various function icons displayed on the display unit 28. For example, the function buttons include an end button, a return button, an image advancing button, a jump button, a narrow-down button, and an attribute change button. For example, when a menu button is pressed, a menu screen by using which various settings can be set is displayed on the display unit 28. A user can intuitively set the various settings using four-direction buttons, a set button, and the menu screen displayed on the display unit 28.

A power supply control unit 80 includes a battery detection circuit, a direct current to direct current (DC-to-DC) converter, and a switch circuit for switching blocks to be energized. The power supply control unit 80 detects the presence or absence of an attached battery, a type of the battery, and a remaining battery capacity. The power supply control unit 80 controls the DC-to-DC converter based on results of such detection and an instruction from the system control unit 50 to supply the necessary voltage for necessary time period to each of the units including the recording medium 200.

A zoom lever 90 is arranged around the shutter button 61. In the imaging mode, the zoom lever 90 serves as an operation unit for zoom operation. In the reproduction mode, the zoom lever 90 serves as an operation unit for enlarging an image d and shifting a screen to an index display screen. In the present exemplary embodiment, clockwise rotation of the zoom lever 90 is referred to as a TELE operation, whereas counterclockwise rotation of the zoom lever 90 is referred to as a WIDE operation. When the TELE operation is performed in image capturing, an image is optically zoomed toward a telephoto side (TELE side). When the WIDE operation is performed in image capturing, an image is optically zoomed toward a wide-angle side (WIDE side). On the other hand, when the TELE operation is performed in image reproduction (overall display), the image is enlarged (electronically zoomed in), a screen is switched from a multi-display screen to a single reproduction screen, or the number of images displayed on the multi-display screen is reduced. Further, when the WIDE operation is performed in image reproduction, the image is reduced (electronically zoomed out), the single reproduction screen is switched to the multi-display screen, or the number of images displayed on the multi-display screen is increased.

The power supply unit 30 includes a primary battery such as an alkaline battery and a lithium battery, a secondary battery such as a nickel-cadmium (NiCd) battery, a nickel-metal hydride (NiMH) battery, and a lithium (Li) battery, and an alternating current (AC) adaptor. An interface 18 is an interface with the recording medium 200 such as a memory card and a hard disk. The recording medium 200 includes a semiconductor memory and a magnetic disk.

The digital camera 100 according to the present exemplary embodiment includes a touch panel serving as one of the members of the operation unit 70. The touch panel is capable of detecting contact with respect to the display unit 28. The touch panel and the display unit 28 can be integrally configured. For example, the touch panel is formed so that a display of the display unit 28 is not disturbed by light transmittance, and such a touch panel is attached to an upper layer on a display surface of the display unit 28. Then, input coordinates on the touch panel are associated with display coordinates on the display unit 28, thereby forming a graphical user interface (GUI). Such a GUI enables the user to operate the touch panel as if the user were directly operating a screen displayed on the display unit 28.

The system control unit 50 can detect the following states or operations to the touch panel.
1: A state of the touch panel is changed from an untouched state to a state in which the touch panel is touched by a finger or a pen. That is, a user starts touching the touch panel (hereinafter referred to as "touch-down").
2: A user is touching the touch panel with the user's finger or a pen (hereinafter referred to as "touch-on").
3: A user is moving the user's finger or a pen with the finger or pen touching the touch panel (hereinafter referred to as "touch-move").
4: A user removes the user's finger or a pen touching the touch panel from the touch panel (hereinafter referred to as "touch-up").
5: Nothing is touching the touch panel (hereinafter referred to as "touch-off").

Such operations/states and position coordinates indicating a position of the finger or pen on the touch panel are notified to the system control unit 50 via an internal bus. The system control unit 50 determines what operations have been performed on the touch panel based on the notified information. As for the touch-move operation, the system control unit 50 also determines directions of the finger or the pen moving on the touch panel with respect to each vertical component and each horizontal component on the touch panel based on changes in position coordinates. Herein, a series of operations from the touch-down to the touch-up through a certain touch-move operation on the touch panel is referred to as a stroke drawing operation. In addition, an operation for quickly drawing a stroke is referred to as a flick. In the flick operation, a user quickly moves the user's finger for a certain distance with the finger touching the touch panel, and then simply removes the finger from the touch panel. In other words, the user quickly slides the user's finger on the touch panel like a flick with the finger. When the system control unit 50 detects the touch-move operation of a predetermined distance or greater at a predetermined speed or higher followed by the touch-up operation, the system control unit 50 determines that the flick operation is performed. Further, when detecting the touch-move operation of a predetermined distance or greater at a speed lower than a predetermined speed, the system control unit 50 determines that a drag operation is performed. An operation in which one optional point on the screen is tapped (i.e., pressed and released) is referred to as "a single touch", whereas an operation in which one optional point on the screen is continuously tapped twice (i.e., repeatedly pressed and released twice) is referred to as "a double touch".

Therefore, each of these "flick", "drag", "single touch", and "double touch" operations is performed when the user touches one point on the touch panel with the user's finger or a pen. Hereinafter, a description is given of operations performed when a plurality of points on the touch panel are being touched down.

A term "pinch" refers to an operation in which a user pinches the touch panel with two fingers or pens. A term "pinch-in" represents an operation in which two fingers or pens are placed on the touch panel and then a distance therebetween is reduced. Meanwhile, a term "pinch-out" represents an operation in which two fingers or pens are placed on the touch panel and then a distance therebetween is increased. In recent years, the pinch-out operation is generally used to control enlargement of an image being displayed on the touch panel, whereas the pinch-in operation is generally used to control reduction of an image being displayed on the touch panel. In the present exemplary embodiment, a point in the middle of two points in the pinch state, that is, a point in the middle of two points being touched down, is referred to as "a pinch center point". Further, the touch panel of the present exemplary embodiment can be any type among various touch panel types such as a resistance film type, a capacitance type, a surface acoustic wave type, an infrared type, an electromagnetic induction type, an image recognition type, and an optical sensor type.

Figure 3:
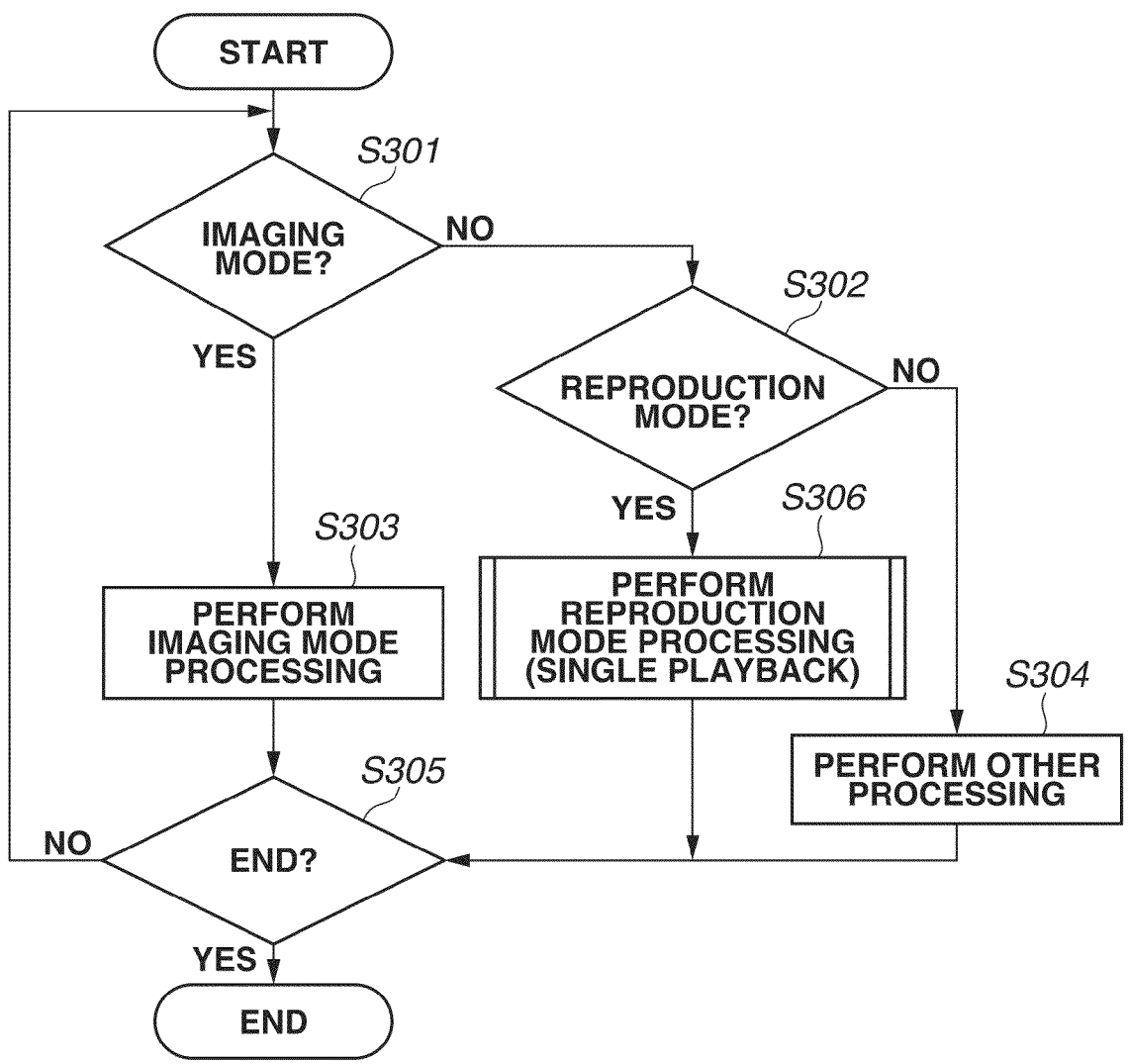
FIG. 3 is a flowchart illustrating an example of basic processing from startup to shutdown of the digital camera according to an exemplary embodiment of the present invention.

FIG. 3 is a flowchart illustrating an example of basic processing from startup to shutdown of the digital camera 100 according to the present exemplary embodiment. The processing illustrated in FIG. 3 is executed by the system control unit 50. The system control unit 50 loads the program recorded in the nonvolatile memory 56 to the system memory 52, and executes the loaded program to implement the processing illustrated in FIG. 3.

When a user operates the power switch 72 to turn on the digital camera 100, the processing of the flowchart illustrated in FIG. 3 starts. In step S301, the system control unit 50 determines whether the digital camera 100 is in the imaging mode based on a position of the mode dial 60. If the system control unit 50 determines that the digital camera 100 is in the imaging mode (YES in step S301), the operation proceeds to step S303. If the digital camera 100 is not in the imaging mode (NO in step S301), the operation proceeds to step S302. In step S302, the system control unit 50 determines whether the digital camera 100 is in the reproduction mode based on a position of the mode dial 60. If the system control unit 50 determines that the digital camera 100 is in the reproduction mode (YES in step S302), then in step S306, the system control unit 50 performs reproduction mode processing. The reproduction mode processing (signal reproduction) is described in detail below. On the other hand, if the system control unit 50 determines that the digital camera 100 is not in the reproduction mode (NO in step S302), the operation proceeds to step S304.

In step S303, the system control unit 50 performs imaging mode processing. Herein, the imaging mode processing includes operations for capturing a still image and a moving image. In step S304, the system control unit 50 performs other processing. Herein, the other processing includes processing in clock display mode in which only current time is displayed. When each of the mode processing is finished, the operation proceeds to step S305. In step S305, the system control unit 50 determines whether an instruction for the shutdown of operation of the digital camera 100 is received by operating the power switch 72 by the user. If the system control unit 50 determines that the shutdown instruction is received (YES in step S305), the operation ends. If the system control unit 50 determines that the shutdown instruction is not received (NO in step S305), the operation returns to step S301.

Figure 4:
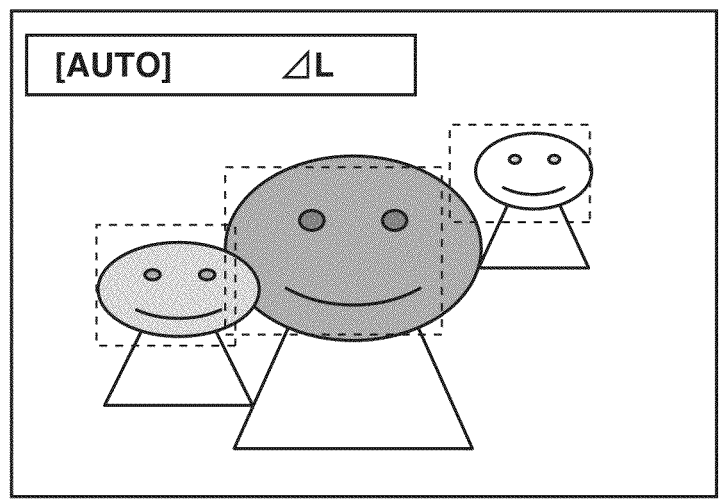
FIG. 4 is a diagram illustrating an example of a screen displayed when an instruction for image capturing preparation operation is being received.

FIG. 4 is a diagram illustrating an example of a screen displayed on the display unit 28 when the shutter button 61 is being half pressed in the imaging mode (when an instruction for image capturing preparation operation is being received). In the example illustrated in FIG. 4, there are three in-focus positions. The in-focus positions and information of the number of in-focus positions at this time are recorded as tag information with an image file in the recording medium 200 after the shutter button 61 is fully pressed (after the image is captured).

Hereinafter, a suitable method for checking an in-focus position according to the present exemplary embodiment is described, by intuitively checking the in-focus position without a laborious procedure in the reproduction mode.

Figure 5:
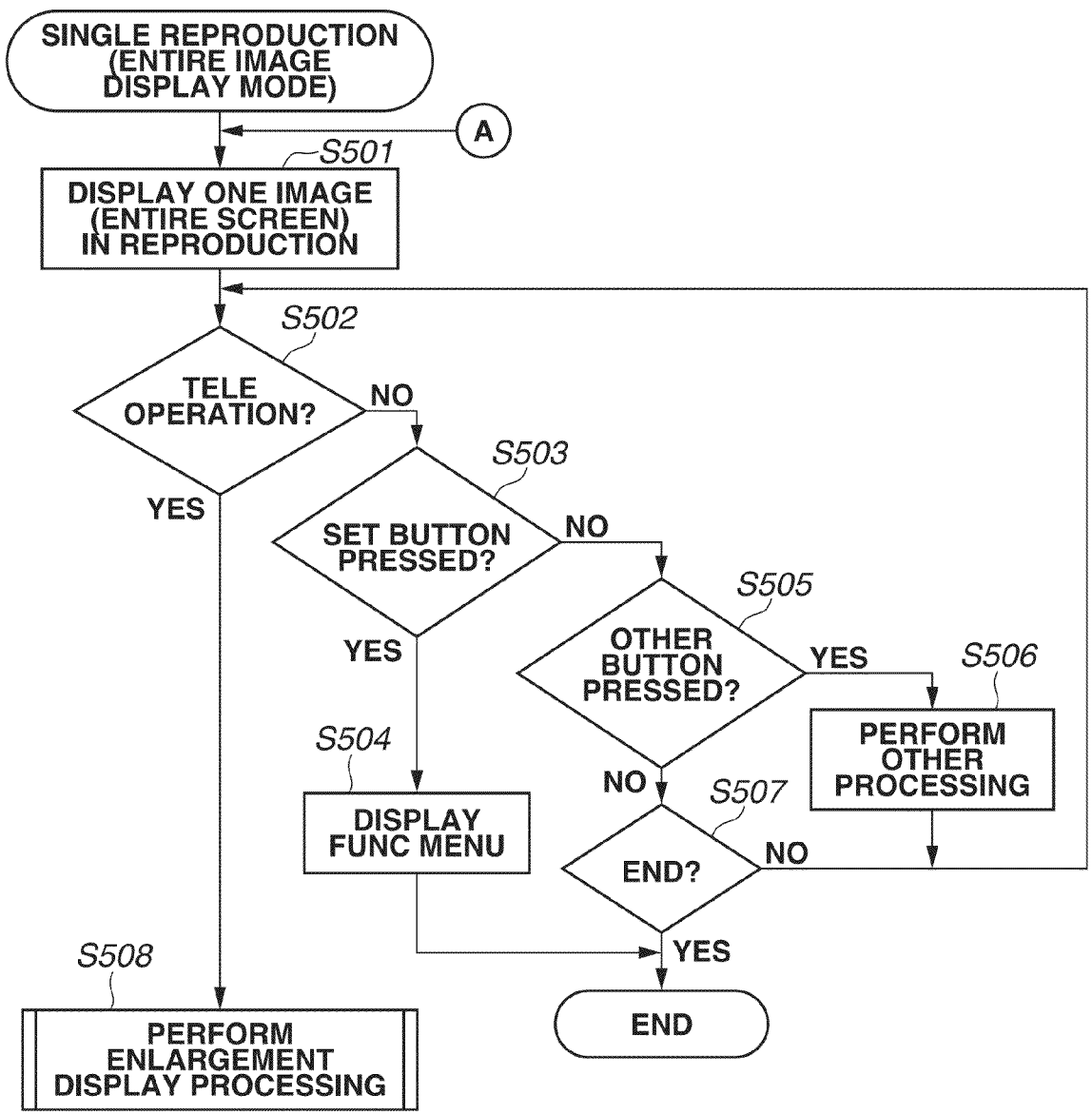
FIG. 5 is a flowchart illustrating an example of processing performed when a reproduction mode is in operation.

FIG. 5 is a flowchart illustrating an example of reproduction processing performed in the reproduction mode. The processing illustrated in FIG. 5 is executed by the system control unit 50. The system control unit 50 loads the program stored in the nonvolatile memory 56 to the system memory 52, and executes the loaded program to implement the processing illustrated in FIG. 5.

Figure 6:
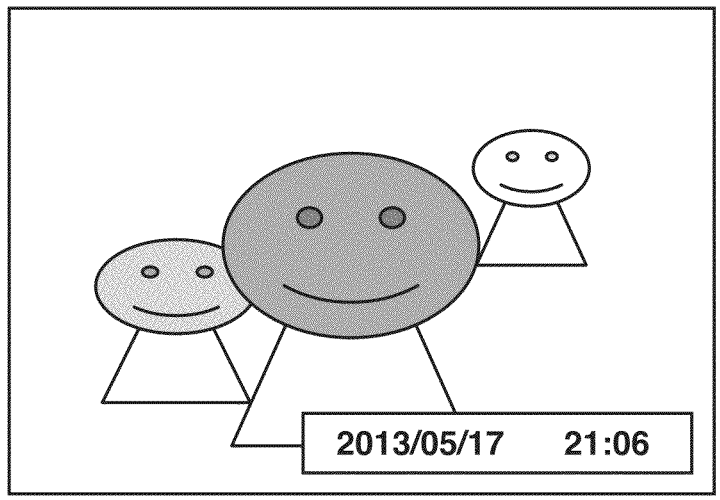
FIG. 6 is a diagram illustrating an example of an image that is normally displayed.

In step S501, the system control unit 50 reads image data from the recording medium 200, and displays an image of the read image data on the display unit 28 so that one entire image is displayed within one screen. FIG. 6 is a diagram illustrating an example of the image displayed on the display unit 28 by performing the processing in step S501.

Subsequently, in step S502, the system control unit 50 determines whether rotation of the zoom lever 90 by the user for the TELE operation is detected. If the system control unit 50 determines that the TELE operation is detected (YES in step S502), then in step S508, the system control unit 50 performs enlargement display processing which is described in detail below. On the other hand, if the system control unit 50 determines that the TELE operation is not detected (NO in step S502), the operation proceeds to step S503.

In step S503, the system control unit 50 determines whether a press of a set button by the user is detected. If the system control unit 50 determines that a press of the set button detected (YES in step S503), the operation proceeds to step S504. If a press of the set button is not detected (NO in step S503), the operation proceeds to step S505.

In step S504, the system control unit 50 performs processing assigned to the set button in the single reproduction. In the present exemplary embodiment, when the set button is pressed during the single reproduction, a selection menu (hereinafter referred to as a FUNC menu) is displayed on the display unit 28. The FUNC menu includes, for example, a menu item for instructing slide-show reproduction, and a menu item for adding attribute information such as a favorite and classification information, and protect to the displayed image. In addition, the FUNC menu includes a menu item for deleting the displayed image, and a menu item for designating the printing of the displayed image.

In the present exemplary embodiment, when the FUNC menu is displayed, the operation illustrated in FIG. 5 once ends so that processing for the FUNC menu is performed. An operation state of the processing for the FUNC menu differs from that of the single reproduction processing. When the processing for the FUNC menu ends, the operation returns to the single reproduction processing in step S501.

On the other hand, in step S505, the system control unit 50 determines whether operations of other buttons are detected. If the system control unit 50 determines that any of the other buttons is pressed (YES in step S505), the operation proceeds to step S506 to perform the processing corresponding to the pressed button. If the system control unit 50 determines that any of the other buttons is not pressed (NO in step S505), the operation proceeds to step S507.

Herein, the operations of the other buttons include operations relating to the four-direction buttons. For example, the system control unit 50 performs processing according to a direction of a pressed button among the four-direction buttons. If a vertical button is pressed (YES in step S505), then in step S506, the system control unit 50 issues an instruction of deletion, transfer, or protection of the image. If a horizontal button is pressed (YES in step S505), then in step S506, the system control unit 50 advances the image (displays a next image or a previous image). Alternatively, if the user performs a touch-move operation in a left direction or a right direction on the touch panel, the system control unit 50 advances the image. Further, if the user performs a touch-move operation in a vertical direction, the system control unit 50 transfers, deletes, or protects the image as touch gesture processing according to a locus of the touch-move operation.

In addition, the operations of the other buttons include the WIDE operation of the zoom lever 90. In such a case, in step S506, the system control unit 50 shifts a screen to an index display screen (a multi-display screen) which displays a list of a plurality of images. Subsequently, the operation returns to step S502.

On the other hand, the system control unit 50 determines whether an instruction to end the reproduction mode is received. The reproduction mode ends, for example, when the power switch 72 is operated by the user, and when the mode dial 60 is operated by the user to shift the operation mode to the imaging mode. If the system control unit 50 determines that the reproduction mode end instruction is received (YES in step S507), the processing ends. If the system control unit 50 determines that the reproduction mode end instruction is not received (NO in step S507), the operation returns to step S502.

Figure 7:
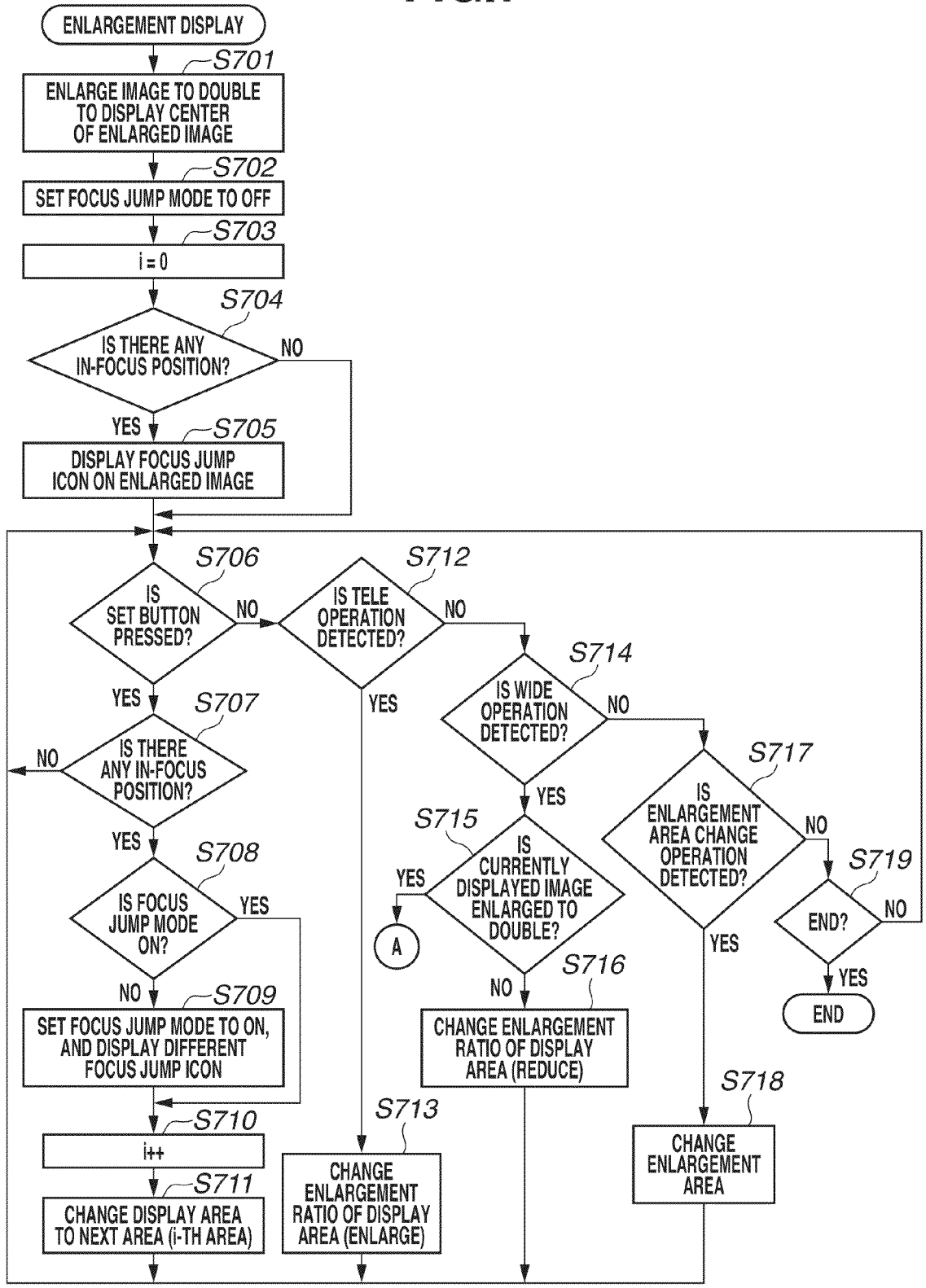
FIG. 7 is a detailed flowchart illustrating an example of processing performed when an image is displayed in an enlarged manner.

FIG. 7 is a detailed flowchart illustrating an example of the enlargement display processing performed in step S508 of the flowchart illustrated in FIG. 5. The system control unit 50 loads the program stored in the nonvolatile memory 56 to the system memory 52, and executes the loaded program to implement the processing illustrated in FIG. 7.

In step S701, the system control unit 50 enlarges the image displayed in the single reproduction to double to display one area from the entire image. Herein, the image is enlarged with respect to the center of the image. In other words, the center of the image displayed in the single display is in the same position as that of the one area of the image displayed by the enlargement display processing performed in step S701.

Subsequently, in step S702, the system control unit 50 sets a focus jump mode to OFF to initialize the focus jump mode. More specifically, the system control unit 50 sets a focus jump mode flag stored in the system memory 52 to OFF. Herein, the focus jump mode flag indicates whether the image has jumped to an in-focus position at least once since the set button is pressed. If the image has jumped to the in-focus position, and the focus jump mode flag is ON, the system control unit 50 determines that the focus jump mode is ON. When the processing is performed in step S702, the display simply transitions from the normal display to the enlargement display. Thus, there is no history of the jump, and the focus jump mode is set to OFF.

In step S703, the system control unit 50 initializes a designation frame variable i stored in the system memory 52. The designation frame variable i is a variable that designates the order of focus frames to be displayed in an enlarged manner. Hereinafter, the focus frame order is described.

Figure 8:
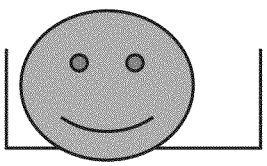
FIG. 8 is a diagram illustrating an example of attribute information about an in-focus position.
Figure 8:
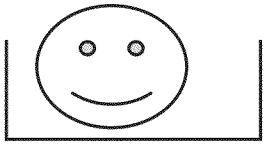
Figure 8:
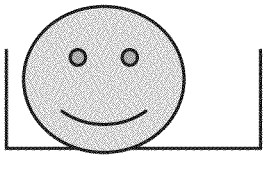

In image data of a reproduction target, information relating to an in-focus position at the time of image capturing is stored as attribute information. For example, FIG. 8 illustrates a relationship between focus frame order and in-focus positions of the images illustrated in FIG. 6. As illustrated in the example in FIG. 8, images of faces and the in-focus positions may be related. However, identification (ID) is provided to each of the in-focus positions, so that each in-focus position is managed as information indicating the area indicated by coordinates within the image or one point of a focus center position. Accordingly, the information of the in-focus position is recorded as the attribute information of the image data.

In the example in FIG. 8, the AF setting at the image capturing is set to face AF that allows the digital camera 100 to focus a face as priority. Accordingly, each of all the in-focus positions illustrated in FIG. 8 is a face area. Although the AF setting at the image capturing is set to the face AF, a face area may not be focused in a case where a subject does not include a face. For example, in a case where an image of landscape or an image of an object is captured, there is no face. Further, in a case where an image of a face is captured by using the setting other than the face AF setting, a face area may not be in an in-focus position.

When the designation frame variable i is determined, the system control unit 50 sets subjects in descending order of priority from a main subject when image of the subjects is captured. Further, information indicating which in-focus position is the in-focus position of the main subject is stored as the attribute information of the image data. In the image illustrated in FIG. 6, if the setting was determined so that a face in the middle at the time of image capturing should be a main subject, the face in the middle has the highest priory in the focus frame order. Thus, the designation frame variable i=1. Similarly, the system control unit 50 prioritizes the other focus frames accordingly, for example, the designation frame variable i=2, 3, and so on. Assume that the designation frame variable i has an upper limit of approximately 20. When the processing is performed in step S703, the display simply transitions from the normal display to the enlargement display, and thus, in-focus position is not designated. Consequently, the designation frame variable=0.

Subsequently, in step S704, the system control unit 50 refers to the attribute information of the displayed enlarged image to determine whether there is at least one in-focus position. If the system control unit 50 determines that there is at least one in-focus position (YES in step S704), the operation proceeds to step S705. On the other hand, if there is no in-focus position (NO in step S704), the operation proceeds to step S706. In step S705, the system control unit 50 displays an icon 901, which indicates that the display can transition to a focus jump mode by pressing the set button, on the enlarged image.

Figure 9:
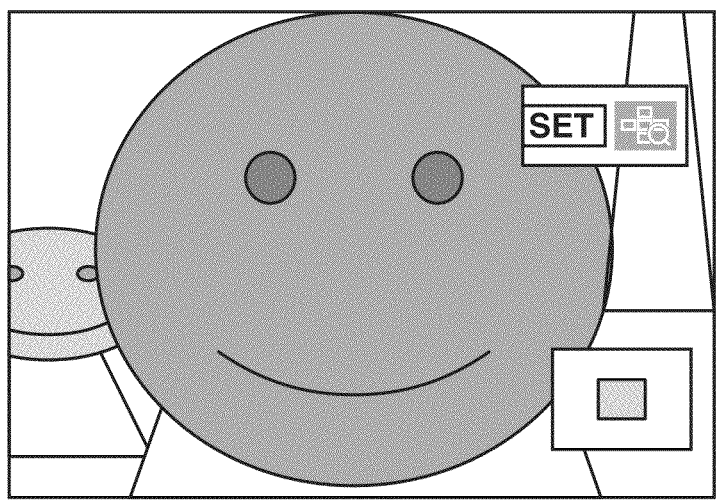
FIG. 9 is a diagram illustrating an example of a display screen immediately after a display transitions from a normal display to an enlargement display.

FIG. 9 is a diagram illustrating an example of a screen displayed immediately after a normal display has transitioned to an enlargement display in a case where there is at least one in-focus position. A user may not anticipate that the display can transition from the enlargement display to the focus jump mode to check the in-focus position. In the present exemplary embodiment, therefore, the icon 901 illustrated in FIG. 9 is displayed as a guide to the user. The icon 901 represents that the enlarged area can jump to the in-focus position by operating the set button.

Subsequently, in step S706, the system control unit 50 determines whether a press of the set button by the user is detected. If the system control unit 50 determines that a press of the set button is detected (YES in step S706), the operation proceeds to step S707. On the other hand, if a press of the set button is not detected (NO in step S706), the operation proceeds to step S712. In step S707, the system control unit 50 refers to the attribute information of the displayed enlarged image to determine whether there is at least one in-focus position. If the system control unit 50 determines that there is at least one in-focus position (YES in step S707), the operation proceeds to step S708. On the other hand, if there is no in-focus position (NO in step S707), the operation returns to step S706.

In step S708, the system control unit 50 refers to the focus jump mode flag stored in the system memory 52 to determine whether the focus jump mode is ON. If the system control unit 50 determines that the focus jump mode is ON (YES in step S708), the operation proceeds to step S710. On the other hand, if the focus jump mode is OFF (NO in step S708), the operation proceeds to step S709. When the set button is pressed first after transition of the display from the normal display to the enlargement display, the focus jump mode is OFF. Accordingly, the operation proceeds to step S709.

Figure 10:
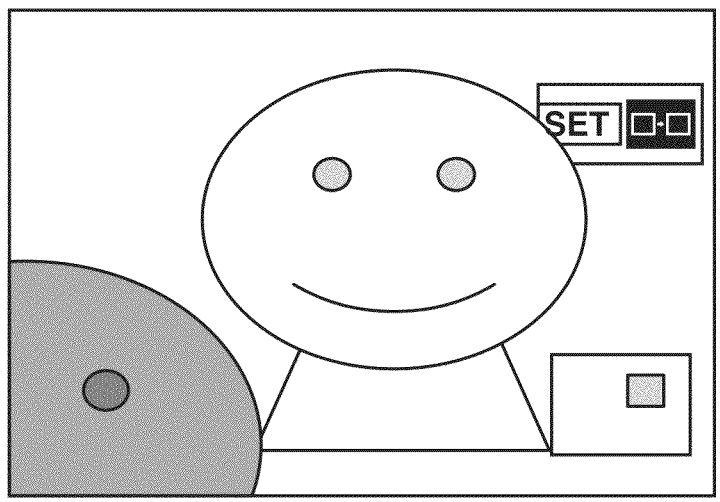
FIG. 10 is a diagram illustrating an example of an enlarged image after an in-focus position in the enlargement display transitions to a next in-focus position.

In step S709, the system control unit 50 sets the focus jump mode flag stored in the system memory 52 to ON, thereby setting the focus jump mode to ON. Further, the system control unit 50 displays a focus jump icon 1001 as illustrated in FIG. 10 instead of the icon 901 displayed in step S705. A display format of the focus jump icon 1001 differs from that of the icon 901 illustrated in FIG. 9. The focus jump icon 1001 indicates that an enlargement position can be changed to a next in-focus position in the next order in response to the press of the set button.

In step S710, the system control unit 50 increments the designation frame variable i, which is stored in the system memory 52, by one. When the set button is pressed first after transition of the display from the normal display to the enlargement display, the designation frame variable i=1.

Subsequently, in step S711, the system control unit 50 changes a region (an enlargement area) to be displayed on the display unit 28 to the enlarged image at the in-focus position in the order indicated by the designation frame variable i. In other words, the system control unit 50 changes the enlargement area in such a manner that a center of an area or one point indicated by information of the in-focus position in i-th order of the focus frame as a destination among pieces of information of the in-focus positions included in the attribute information of the image becomes a center of an area be displayed. Accordingly, the enlargement area jumps so that the center of the in-focus position in i-th order of the focus frame is enlarged and displayed. Therefore, the user can check the focus using the displayed enlarged image. Subsequently, in step S706, the system control unit 50 waits for receiving an event.

On the other hand, in step S712, the system control unit 50 determines whether the TELE operation of the zoom lever 90 by the user is detected. If the system control unit 50 determines that the TELE operation performed by the user is detected (YES in step S712), the operation proceeds to step S713. On the other hand, if the TELE operation performed by the user is not detected (NO in step S712), the operation proceeds to step S714. In step S713, the system control unit 50 changes an enlargement ratio to further enlarge the displayed image. Since the image is displayed at an enlargement ratio of two times immediately after transition of the display from the normal display to the enlargement display, the enlargement ratio becomes greater than two times in step S713. Further, the system control unit 50 sets the focus jump mode to ON. Then, the operation returns to step S706. In step S706, the system control unit 50 waits for receiving an event.

In step S714, the system control unit 50 determines whether the WIDE operation of the zoom lever 90 by the user is detected. If the system control unit 50 determines that the WIDE operation performed by the user is detected (YES in step S714), the operation proceeds to step S715. On the other hand, if the WIDE operation performed by the user is not detected (NO in step S714), the operation proceeds to step S717.

In step S715, the system control unit 50 determines whether the currently displayed image is displayed at the enlargement ratio of two times. If the system control unit 50 determines that the image is displayed at the enlargement ratio of two times (YES in step S715), the display needs to return to the normal display. Thus, the operation proceeds to step S501 of the flowchart illustrated in FIG. 5. On the other hand, if the system control unit 50 determines that the image is not displayed at the enlargement ratio of two times (NO in step S715), the operation proceeds to step S716. In step S716, the system control unit 50 changes the enlargement ratio to reduce the size of the displayed image. Assume that the reduced image herein is larger than twice the enlargement ratio in the normal display. Then, the operation returns to step S706 in which the system control unit 50 waits for receiving an event.

In step S717, the system control unit 50 determines whether an operation of any of the four-direction buttons or the touch-move operation on the touch panel is detected. These operations are performed by the user to optionally change a display area of the enlargement display. If the system control unit 50 determines that the operation of the four-direction button or the touch-move operation on the touch panel is detected (YES in step S717), the operation proceeds to step S718. On the other hand, if the operation of the four-direction button or the touch-move operation on the touch panel is not detected (NO in step S717), the operation proceeds to step S719. In step S718, the system control unit 50 changes the display area of the enlargement display toward a direction according to the operation of the four-direction button or the touch-move operation. The enlargement area at this time can be changed. Although the in-focus position is set to a face, the face can be displayed in a position other than the in-focus position. In other words, the enlargement area in the enlargement display can be changed to an optional position by user operation.

In step S719, the system control unit 50 determines whether to finish the enlargement display based on the criterion which is similar to that applied in step S507 of the flowchart illustrated in FIG. 5. If the system control unit 50 determines that the enlargement display should be finished (YES in step S719), the processing ends. On the other hand, if the system control unit 50 determines that the enlargement display should not be finished (NO in step S719), the operation returns to step S706 in which the system control unit 50 waits for receiving an event.

If the designation frame variable i is greater than one (i>1) after the processing is shifted to the enlargement display processing, the system control unit 50 repeatedly performs the processing of steps S706, S707, S708, S710, and S711. Accordingly, in a case where there is a plurality of in-focus positions, the user can sequentially check whether each of the focuses is adjusted by sequentially enlarging the plurality of in-focus positions by repeatedly pressing the set button. In the present exemplary embodiment, therefore, after the reproduction mode is activated, the user once performs the TELE operation. This TELE operation causes the normal display to transition to the enlargement display. Subsequently, the user presses the set button, so that the enlargement display jumps, thereby arranging the center of the in-focus position in the enlargement area. Accordingly, the present exemplary embodiment can provide the intuitive operation method which allows the user to check the focus.

The present exemplary embodiment has been described using a case in which the in-focus positions included in the attribute information of the image are sequentially enlarged and displayed as jump targets. However, the present exemplary embodiment is not limited thereto. For example, face areas of human figures may be sequentially enlarged and displayed regardless of the in-focus positions. In such a case, in the processing in step S704, the system control unit 50 determines whether there is information of the face areas in the attribute information of the image. The system control unit 50 also determines whether the faces are detected after face detection processing is performed on the image data which is being reproduced. If either of the conditions is satisfied (YES in step S704), the operation proceeds to step S705 in which the system control unit 50 displays an icon indicating that the display can transition to a face jump mode by pressing the set button. In step S707, the system control unit 50 determines whether the face-related condition is satisfied in a similar manner to the determination made in step S704. Further, the designation frame variable i designates a face to be displayed in an enlarged manner among the plurality of faces.

Further, the in-focus position and the face position may be combined to provide a jump target. In such a case, in step S704, the system control unit 50 determines whether there is information of the in-focus position in the attribute information of the image, whether there is information of a face area in the attribute information of the image, and whether the face is detected as a result of face detection processing performed on the image data which is being reproduced. If at least one of these conditions is satisfied (YES in step S704), the operation proceeds to step S705. In step S705, the system control unit 50 displays an icon indicating that the display can transition to an in-focus position/face position jump mode by pressing the set button. In step S707, the system control unit 50 determines whether the in-focus position-related condition and the face-related condition are satisfied in a similar manner to the determination made in step S704.

Further, the designation frame variable i can be a variable for designating an enlargement display of any of a single or a plurality of in-focus positions, and a single or a plurality of faces. First, jump orders are designated (jump order designated by the designation frame variable i) in descending order of focus frame priority (in order from first to last). Secondly, the jump orders are designated in descending order of face priority. Then, the jump orders are again designated in descending order of focus frame priority. More specifically, when the set button is pressed with the enlarged image being displayed, an in-focus position of a main subject is first displayed in the enlargement area. Thereafter, when the set button is repeatedly pressed, enlarged images at the in-focus positions are sequentially displayed in descending order of the focus frame priority. Subsequently, enlarged face images are sequentially displayed in descending order of the face priority. Lastly, the enlarged image at the in-focus position having the high focus frame priority is again displayed. Such a procedure reduces confusion between the in-focus position and the face.

Further, in the present exemplary embodiment, the focus jump icon 1001 is displayed in step S709 of the flowchart illustrated in FIG. 7. However, a face motif icon may be used instead of the focus jump icon 1001 if the system control unit 50 knows beforehand that a next area to be selected is a face.

In such a case, the face motif icon can more explicitly indicate that a jump destination is a face area. Further, in the present exemplary embodiment, the function of the set button during the single reproduction (during the normal display) is allocated to the display of the FUNC menu. However, since the display of the FUNC menu is restricted during the enlargement display, another operation can be assigned to the function of the set button during the enlargement display. Therefore, in the present exemplary embodiment, the focus jump function is assigned to the set button in the enlargement display. This enables the user to intuitively perform an operation with few operation members.

As described above, according to the present exemplary embodiment, during the enlargement display, the function of jumping to the focus position is assigned to the operation member to which a function is not conventionally assigned. This enables the user to more intuitively check the in-focus position with fewer procedures.

The system control unit 50 may comprehensively control the digital camera 100 using one hardware or a plurality of hardware. If the plurality of hardware is used, processing can be shared. The present invention has been described using the exemplary embodiments. However, the present invention is not limited thereto. The present invention encompasses all modifications and alternations within the gist of the present invention. Further, the present invention can include a combination of each of the above exemplary embodiments.

In the above exemplary embodiments, the present invention has been described using the digital camera 100 as an example, but not limited thereto. The exemplary embodiments of the present invention may be applied to a display control apparatus including a plurality of operation units. More specifically, aspects of the present invention may be applied to a personal computer, a personal digital assistant (PDA), a mobile phone terminal, and a mobile image viewer.

Aspects of the present invention may be achieved by executing the following processing. Specifically, the software (programs) for performing the functions of the above exemplary embodiments is supplied to a system or a device through a network or various storage media, so that a computer (or a CPU or a micro-processing unit (MPU)) of such a system or device reads a program code to execute the processing. In this case, the present invention includes such a program and a computer-readable storage medium storing the program.

According to the present invention, a user can transition the display so as to check a specific subject by a more intuitive operation method.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-170693 filed Aug. 20, 2013, which is hereby incorporated by reference herein in its entirety.

What is claimed is:

1. A display control apparatus comprising:
a display control unit configured, in response to an operation with respect to a first operation unit when an entire display by which an entire image is displayed on a display unit is being performed, to control a display so as to switch the entire display to an enlargement display by which a portion of the image is enlarged and displayed; and
a control unit configured, in response to an operation performed with respect to a second operation unit different from the first operation unit when the enlargement display is being performed, to control a display area of the enlargement display so as to change the display area to an area corresponding to an in-focus position of the image.

2. The display control apparatus according to claim 1, wherein the control unit changes, when an operation with respect to the second operation unit is further performed after the display area of the enlargement display is changed to the area corresponding to the in-focus position of the image, the display area of the enlargement display to an area corresponding to another in-focus position of the image.

3. The display control apparatus according to claim 1, wherein the control unit changes, when an operation with respect to the second operation unit is further performed after the display area of the enlargement display is changed to the area corresponding to the in-focus position of the image, the display area of the enlargement display to an area corresponding to a position of a face detected from the image.

4. The display control apparatus according to claim 1, wherein the display control unit displays, when the entire display is switched to the enlargement display in response to the operation with respect to the first operation unit, an enlarged image and a guidance of a function to be performed according to the operation of the second operation unit in the enlargement display.

5. The display control apparatus according to claim 4, wherein the display control unit performs control, in response to the operation performed with respect to the second operation unit when the enlargement display is being performed, to change a display style of the guidance or to display another guidance indicating a function of the second operation unit such that the other guidance is displayed.

6. The display control apparatus according to claim 1, wherein the control unit performs a control, in response to the operation performed with respect to the second operation unit when the entire display is being performed, different from a control by which the display area is changed to the area corresponding to the in-focus position of the image.

7. The display control apparatus according to claim 6, wherein the control unit performs control, in response to the operation of the second operation unit when the entire display is being performed, to display a menu for selecting processing with respect to the image to be selected.

8. The display control apparatus according to claim 1, wherein the control unit performs control, when there is no in-focus position in the image although the operation with respect to the second operation unit is performed during the enlargement display, not to change the display area of the enlargement display.

9. The display control apparatus according to claim 4, wherein the display control unit performs control, when there is no in-focus position in the image upon switching from the entire display to the enlargement display in response to the operation with respect to the first operation unit, not to display the guidance.

10. The display control apparatus according to claim 1, wherein the control unit performs control, in response to an operation performed with respect to a third operation unit when the enlargement display is being performed, to change the display area of the enlargement display to a position corresponding to the operation with respect to the third operation unit.

11. A display control apparatus according to claim 3,
wherein the display control unit displays, when the entire display is switched to the enlargement display in response to the operation with respect to the first operation unit, an enlarged image and a guidance of a function to be performed according to the operation of the second operation unit in the enlargement display, and
wherein the display control unit performs control, in response to the operation performed with respect to the second operation unit when the enlargement display is being performed, a different guidance to be displayed instead of the guidance depending on whether a destination of the enlargement area in a case where the second operation unit is operated next time is an in-focus position or a face position.

12. A display control apparatus according to claim 1, further comprising an acquisition unit configured to acquire information of an in-focus position from attribute information of an image,
wherein the control unit performs control, based on the in-focus position acquired by the acquisition unit from the attribute information of the displayed image, to change the display area of the enlargement display to an area corresponding to the in-focus position of the image.

13. The display control apparatus according to claim 1, wherein the display control apparatus is an imaging apparatus including an imaging unit.

14. A display control apparatus, comprising:
a display control unit configured, in response to an operation with respect to a first operation unit when an entire display by which an entire image is displayed on a display unit is being performed, to perform control so as to switch the entire display to an enlargement display by which a portion of the image is enlarged and displayed; and
a control unit configured, in response to an operation performed with respect to a second operation unit different from the first operation unit when the enlargement display is being performed, to perform control so as to change a display area of the enlargement display to an area corresponding to a position of a face included in the image.

15. A control method for a display control apparatus, comprising:
performing control, in response to an operation performed with respect to a first operation unit when an entire display by which an image is entirely displayed on a display unit is being performed, so as to switch the entire display to an enlargement display by which one portion of the image is enlarged and displayed; and
performing control, in response to an operation performed with respect to a second operation unit different from the first operation unit when the enlargement display is being performed, so as to change a display area of the enlargement display to an area corresponding to an in-focus position of the image.

16. A control method for the display control apparatus, comprising:
performing control, in response to an operation performed with respect to a first operation unit when an entire display by which an image is entirely displayed on a display unit is being performed, so as to switch the entire display to an enlargement display by which one portion of the image is enlarged and displayed; and
performing control, in response to an operation performed with respect to a second operation unit different from the first operation unit when the enlargement display is being performed, so as to change a display area of the enlargement display to an area corresponding to a position of a face included in the image.

17. A non-transitory computer-readable storage medium storing a program for causing a computer to execute the control method for the display control apparatus according to claim 15.

18. A non-transitory computer-readable storage medium storing a program for causing a computer to execute the control method for the display control apparatus according to claim 16.

* * * * *